United States Patent [19]
Lange

[11] 3,943,710
[45] Mar. 16, 1976

[54] INSTALLATION FOR THE CATALYTIC AFTERBURNING OF EXHAUST GASES OF A MULTI-CYLINDER INTERNAL COMBUSTION ENGINE

[75] Inventor: Karlheinz Lange, Stuttgart, Germany

[73] Assignee: Dr. Ing.h.c.F. Porsche Aktiengesellschaft, Germany

[22] Filed: Apr. 24, 1974

[21] Appl. No.: 463,798

[30] Foreign Application Priority Data
May 2, 1973 Germany............................ 2322057

[52] U.S. Cl................................ 60/288; 23/288 FA
[51] Int. Cl.² ......................................... F02B 75/10
[58] Field of Search..................... 60/288, 287, 286; 23/288 FA

[56] References Cited
UNITED STATES PATENTS

| | | |
|---|---|---|
| 3,188,167 | 6/1965 | Specht............................ 23/288 FA |
| 3,297,400 | 1/1967 | Eastwood ..................... 23/288 FA |
| 3,744,248 | 7/1973 | Foster.................................. 60/286 |
| 3,751,917 | 8/1973 | Garcea.................................. 60/288 |
| 3,757,521 | 9/1973 | Tourtellotte ....................... 60/286 |
| 3,783,619 | 1/1974 | Alquist................................. 60/288 |
| 3,823,555 | 7/1974 | Cole...................................... 60/288 |

FOREIGN PATENTS OR APPLICATIONS

| | | |
|---|---|---|
| 1,476,508 | 3/1970 | Germany ............................. 60/287 |

*Primary Examiner*—Douglas Hart
*Attorney, Agent, or Firm*—Craig & Antonelli

[57] ABSTRACT

An installation for the catalytic afterburning of exhaust gases of a multi-cylinder internal combustion engine with two exhaust gas lines of which each includes at least one catalyst; means are thereby provided for conducting the entire exhaust gas stream, when the internal combustion engine is cold, only through one of the two catalysts for a predetermined time.

11 Claims, 1 Drawing Figure

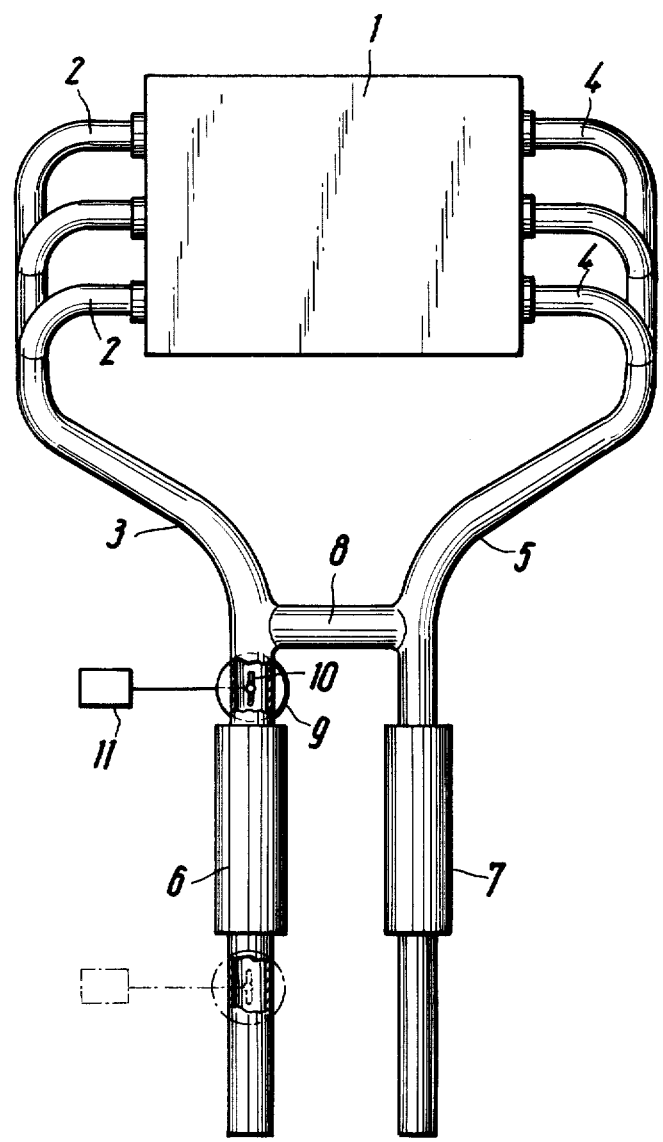

INSTALLATION FOR THE CATALYTIC AFTERBURNING OF EXHAUST GASES OF A MULTI-CYLINDER INTERNAL COMBUSTION ENGINE

The present invention relates to an installation for the catalytic afterburning of exhaust gases of a multi-cylinder internal combustion engine with two exhaust gas lines, of which each includes at least one catalyst.

Installations for the catalytic afterburning of exhaust gases of a mutli-cylinder internal combustion engine with two exhaust lines are known, of which each includes at least one catalyst, which are acted upon or attacked in common by the exhaust gases after the starting of the internal combustion engine. As a result of the common attack of the catalysts, an undesirably long period of time elapses until the catalysts have reached a temperature at which the catalytic afterburning of the exhaust gases starts fully. It has thereby proved as particularly disadvantageous that precisely in the first few minutes after the starting of the internal combustion engine, when the latter is still relatively cold, the exhaust gases contain a particularly large amount of components harmful to health.

It is the object of the present invention to provide an installation for the catalytic afterburning of exhaust gases of an internal combustion engine which does not exhibit these disadvantages and shortcomings.

The problems underlying the present invention are solved in that the installation includes devices which with a cold internal combustion engine, conduct the entire exhaust gas flow for a predetermined time by way of only one of the two catalysts. It is advantageous that the devices are formed by a connecting line connecting the exhaust gas pipes upstream of the catalysts and by a throttle valve arranged upstream or downstream of one of the catalysts in one of the exhaust gas lines, which is actuated in dependence of an adjusting motor controlled by a thermo-element. The throttle valve closes the one exhaust gas line with a cold internal combustion engine and opens again the exhaust gas line after a predetermined time, for example, in dependence on the temperature of the catalyst acted upon by all of the exhaust gases or of the internal combustion engine.

The advantages achieved with the present invention consist in particular in that an installation for the catalytic afterburning of exhaust gases of an internal combustion engine is created in a simple manner, by means of which the exhaust gases are purified within the shortest period of time after the starting of the internal combustion engine, already with a still relatively cold internal combustion engine because, as a result of the attack of only one catalyst with all of the exhaust gases of the internal combustion engine, this catalyst reaches its operating temperature very rapidly. If the second catalyst is interconnected, then the second catalyst reaches its operating temperature also within the shortest period of time by reason of the already very high exhaust gas temperature and of the already heated-up exhaust gas pipes. Prior to the interconnection of the second catalyst, the warm-up enrichment of the fuel mixture can be increasingly reduced by reason of the warming-up internal combustion engine so that after the second catalyst is connected in, the exhaust of harmful materials is very slight in the warm-up phase of the second catalyst.

These and further objects, features, and advantages of the present invention will become more apparent from the following description when taken in connection with the accompanying drawing which shows, for purposes of illustration only, one embodiment in accordance with the present invention, and wherein:

The single FIGURE is a schematic view of one embodiment of an installation for the catalytic afterburning of exhaust gases of a multi-cylinder internal combustion engine according to the present invention.

Referring now to the single FIGURE of the drawing, reference numeral 1 designates in this FIGURE an internal combustion engine arranged in a motor vehicle as driving engine for the vehicle which may be constructed, for example, as opposed cylinder-type engine or as V-engine. The exhaust gas lines 2 coordinated to the cylinders on one side are combined into a common exhaust line or manifold 3, and the exhaust pipes 4 coordinated to the cylinders arranged on the other side of the engine are combined into a common exhaust gas line or manifold 5. A catalyst 6 is arranged in the exhaust gas line 3 and a catalyst 7 is arranged in the exhaust gas line 5. The exhaust gas lines 3 and 5 are connected with each other by a connecting line 8 upstream of the catalysts 6 and 7. Upstream of the catalyst 6 and downstream of the connecting line 8, a throttle valve 10 actuated by an adjusting motor 9 of any conventional type is arranged in the exhaust gas line 3 whereby the adjusting motor 9 is controlled by a thermo-element 11 of any conventional type, such as a heat-sensor, arranged eithier within the area (effective range) of the internal combustion engine 1 or within the area (effective range) of the catalyst 7. The throttle valve 10, however, may also be arranged in the exhaust gas line 3 downstream of the catalyst 6 where it is illustrated in dash and dot lines.

If the cold internal combustion engine 1 is started, then the engine runs at first with a rich fuel mixture which has a high proportion of harmful components. Due to the still relatively low temperature of the internal combustion engine and/or the catalyst 7, the throttle valve 10 is pivoted, controlled by the thermo-element 11 by means of the adjusting motor 9 into a position in which it closes the exhaust gas line 3 so that the exhaust gases in the exhaust gas line 3 are conducted also into the exhaust gas line 5 by way of the connecting line 8. Due to the fact that the catalyst 7 is acted upon with the entire exhaust gas flow of the internal combustion engine, the catalyst 7 is heated up very rapidly to a temperature at which it becomes fully effective. The throttle valve 10 is pivoted into the illustrated position in dependence on the temperature of the internal combustion engine 1 or of the catalyst 7 after a predetermined time so that the exhaust gases of the exhaust gas line 3 then act upon the catalyst 6. By reason of the very high exhaust gas temperatures which exist already at this moment and of the warmed-up exhaust gas lines, the catalyst 6 is heated up in a very short period of time to a temperature at which it is also becomes fully effective. The non-purified exhaust gases which are discharged during this relatively short warm-up phase, additionally exhibit a lesser proportion of harmful components than the exhaust gases with a cold internal combustion engine since the warm-up enrichment of the fuel mixture is reduced with increasing temperature of the internal combustion engine.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for the catalytic afterburning of exhaust gases of a multi-cylinder internal combustion engine having two cylinder rows with two exhaust gas lines, each of which includes at least one catalyst means, coordinated to each cylinder row and communicating with each other only downstream of the cylinder rows, characterized by temperature-responsive means operable during engine start-up to conduct substantially the entire exhaust gas flow from the internal combustion engine during warmup for a predetermined time by way of only one of the two catalyst means and then after a short period of time to conduct the exhaust gas flow from each row of cylinders by way of its associated gas line and catalyst means.

2. An installation according to claim 1, characterized in that the communication between the exhaust gas lines is effected by a connecting line upstream of the catalyst means, and said temperature-responsive means including a throttle valve arranged in one of the exhaust gas lines in the flow path of the other catalyst means and means for actuating the throttle valve means.

3. An installation according to claim 2, characterized in that the temperature-responsive means includes an adjusting motor controlled by a heat-responsive element.

4. An installation according to claim 3, characterized in that the throttle valve means is arranged upstream of said other catalyst means.

5. An installation according to claim 3, characterized in that the throttle valve means is arranged downstream of the other catalyst means.

6. An installation according to claim 2, characterized in that the throttle valve means closes the one exhaust gas line with a cold internal combustion engine and after a predetermined time again opens the same.

7. An installation according to claim 6, characterized in that the throttle valve means opens the exhaust gas line in dependence on the temperature of the catalyst means acted upon by all of the exhaust gases.

8. An installation according to claim 6, characterized in that the throttle valve means opens the exhaust gas line in dependence on the temperature of the internal combustion engine.

9. An installation according to claim 6, characterized in that the temperature-responsive means includes an adjusting motor controlled by a heat-responsive element.

10. An installation according to claim 9, characterized in that the throttle valve means is arranged upstream of said other catalyst means.

11. An installation according to claim 9, characterized in that the throttle valve means is arranged downstream of the other catalyst means.

* * * * *